United States Patent
Raggam

(12) 
(10) Patent No.: US 6,219,530 B1
(45) Date of Patent: Apr. 17, 2001

(54) TRANSPONDER COMMUNICATION STATION PROVIDED WITH A TRANSMISSION COIL CONFIGURATION WITH THREE TRANSMISSION COILS

(75) Inventor: Peter Raggam, St. Stefan im Rosental (AT)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/467,595

(22) Filed: Dec. 20, 1999

(30) Foreign Application Priority Data

Dec. 30, 1998 (EP) .................................................. 98890380

(51) Int. Cl.⁷ ...................................................... H04B 5/00

(52) U.S. Cl. .......................... 455/41; 455/106; 455/276.1; 340/572.5; 340/572.7; 340/10.1; 340/10.3

(58) Field of Search .................................. 455/41, 40, 73, 455/106, 101, 276.1; 340/572.5, 572.2, 572.1, 572.4, 572.7, 10.6, 10.3, 10.1; 342/42, 50, 51

(56) References Cited

U.S. PATENT DOCUMENTS 5,258,766 * 11/1993 Murdoch ............................... 343/742
5,594,448 * 1/1997 D'Hont ................................... 342/44

FOREIGN PATENT DOCUMENTS

WO9749076 12/1997 (WO) ............................ G08B/13/24

* cited by examiner

Primary Examiner—Fan Tsang
Assistant Examiner—Marceau Milord

(57) ABSTRACT

A communication station (1) for contactless communication with at least one transponder is provided with a transmission coil configuration (2) with an active, first transmission coil circuit (3) which includes a first transmission coil (4) and with a passive, second transmission coil circuit (7) which includes a second transmission coil (8), and additionally with an active, third transmission coil circuit (11) which includes a third transmission coil (12); in a preferred embodiment a coupling coil (15) is coupled to the second transmission coil (8), first receiving means (32) being connected to the first transmission coil circuit (3) and to the third transmission coil circuit (11) whereas second receiving means (37) are connected to the coupling coil (15), both receiving means (32, 37) delivering received data (RDA) which can be applied to data evaluation means (19).

22 Claims, 2 Drawing Sheets

TRANSPONDER COMMUNICATION STATION PROVIDED WITH A TRANSMISSION COIL CONFIGURATION WITH THREE TRANSMISSION COILS

The invention relates to a communication station which is arranged for contactless communication with at least one transponder and is provided with a transmission coil configuration with an active, first transmission coil circuit which includes a first transmission coil wherethrough a coil current can be driven, and with a passive, second transmission coil circuit which includes a second transmission coil which is oriented essentially parallel to the first transmission coil, is arranged opposite the first transmission coil and is inductively coupled to the first transmission coil, a coil current which has been phase shifted essentially 90° with respect to the coil current that can be driven through the first transmission coil being drivable through said second transmission coil as a result of the inductive coupling to the first transmission coil, and is also provided with transmission means which are arranged to generate a transmission signal and are connected to the first transmission coil circuit, and also with first receiving means which are connected to the first transmission coil circuit and are arranged to receive a first receiving signal obtained by means of the first transmission coil circuit, and also with evaluation means which are connected to the first receiving means and whereby received data, corresponding to the first receiving signal received by the first receiving means, can be evaluated.

The invention also relates to a transmission coil configuration which is intended for use in a communication station for contactless communication with at least one transponder and is provided with an active, first transmission coil circuit which includes a first transmission coil wherethrough a coil current can be driven, and with a passive, second transmission coil circuit which includes a second transmission coil which is oriented essentially parallel to the first transmission coil, is arranged opposite the first transmission coil and is inductively coupled to the first transmission coil, a coil current which has been phase shifted essentially 90° with respect to the coil current that can be driven through the first transmission coil being drivable through said second transmission coil as a result of the inductive coupling to the first transmission coil.

A communication station of the kind set forth in the first paragraph and a transmission coil configuration of the kind set forth in the second paragraph are already commercially available and widely used in practice and hence are known. For such a communication station and such a transmission coil configuration, reference can be made, for example, to the patent document WO 97/49076 A1.

The aim in such communication stations and transmission coil configuration is always to achieve an as high as possible recognition reliability, i.e. to recognize any transponder entering the communication range of such a communication station and such a transmission coil configuration with a high degree of reliability, and also to achieve an as high as possible communication dependability, i.e. to communicate with such a transponder with a high degree of dependability. Even though in many cases a high degree of recognition reliability and communication dependability are achieved by means of the known communication system and the known transmission coil configuration, it has been found that the recognition reliability and the communication dependability that can be achieved for more critical applications are not satisfactory.

It is an object of the invention to improve a communication system of the kind set forth in the first paragraph and a transmission coil configuration of the kind set forth in the second paragraph and to realize an improved communication system and an improved transmission coil configuration which offer a recognition reliability and a communication dependability which are distinctly higher than those of the known communication station and the known transmission coil configuration.

In order to achieve the described object a communication system of the kind set forth in the first paragraph according to the invention is characterized in that the transmission coil configuration is additionally provided with an active, third transmission coil circuit which includes a third transmission coil which is oriented transversely of the first transmission coil, is arranged so as to be offset relative to the first transmission coil, and through which there can be driven a coil current which has one of two phase angles relative to the coil current that can be driven through the first transmission coil, the two phase angles being 0° or 180°, and that the transmission means and the first receiving means are also connected to the third transmission coil circuit.

In order to achieve the described object a transmission coil configuration of the kind set forth in the second paragraph according to the invention is characterized in that the transmission coil configuration is additionally provided with an active, third transmission coil circuit which includes a third transmission coil which is oriented transversely of the first transmission coil, is arranged so as to be offset relative to the first transmission coil, and through which there can be driven a coil current which has one of two phase angles relative to the coil current that can be driven through the first transmission coil, the two phase angles being 0° or 180°.

Taking the steps according to the invention, an additional magnetic field configuration is created by means of the third transmission coil, in co-operation with the first transmission coil and the second transmission coil, said additional magnetic field configuration offering an essentially higher recognition reliability and an essentially higher communication dependability in comparison with the art known thus far.

A further, significant contribution to said high recognition reliability and said high communication dependability is realized by taking the steps disclosed in the claims 2 and 13.

The means for coupling in a communication station according to the invention and in a transmission coil configuration according to the invention may be formed by a flat, fourth transmission coil which is arranged opposite the second transmission coil. It has been found to be advantageous, however, to take the steps disclosed in the claims 3 and 14, because a particularly tight coupling can thus be created and hence a second receiving signal with a satisfactorily high level is obtained.

With a view to achieving an as simple as possible construction of the transmission coils, it has been found that it is very advantageous to take the steps disclosed in the claims 5 and 6 or the claims 16 and 17.

With a view to achieving a high degree of recognition reliability and communication dependability, it has been found that the steps disclosed in the claims 7 and 18 are particularly advantageous.

With a view to achieving an as simple as possible electrical construction, it has been found that the steps disclosed in the claims 8 and 9 or the claims 19 and 20 are very advantageous.

A construction which is particularly advantageous in practice is characterized by the steps disclosed in the claims 10 and 11 or the claims 21 and 22. In this context it has been found that it is particularly advantageous to take the steps according to the invention for conveyor belts for luggage at airports or for conveyor belts for products in factories.

The foregoing aspects and further aspects of the invention will become apparent from and will be elucidated with reference to the following embodiment.

The invention will be described in detail hereinafter on the basis of an embodiment which is shown in the drawings, however, without the invention being restricted thereto.

Figure 1:
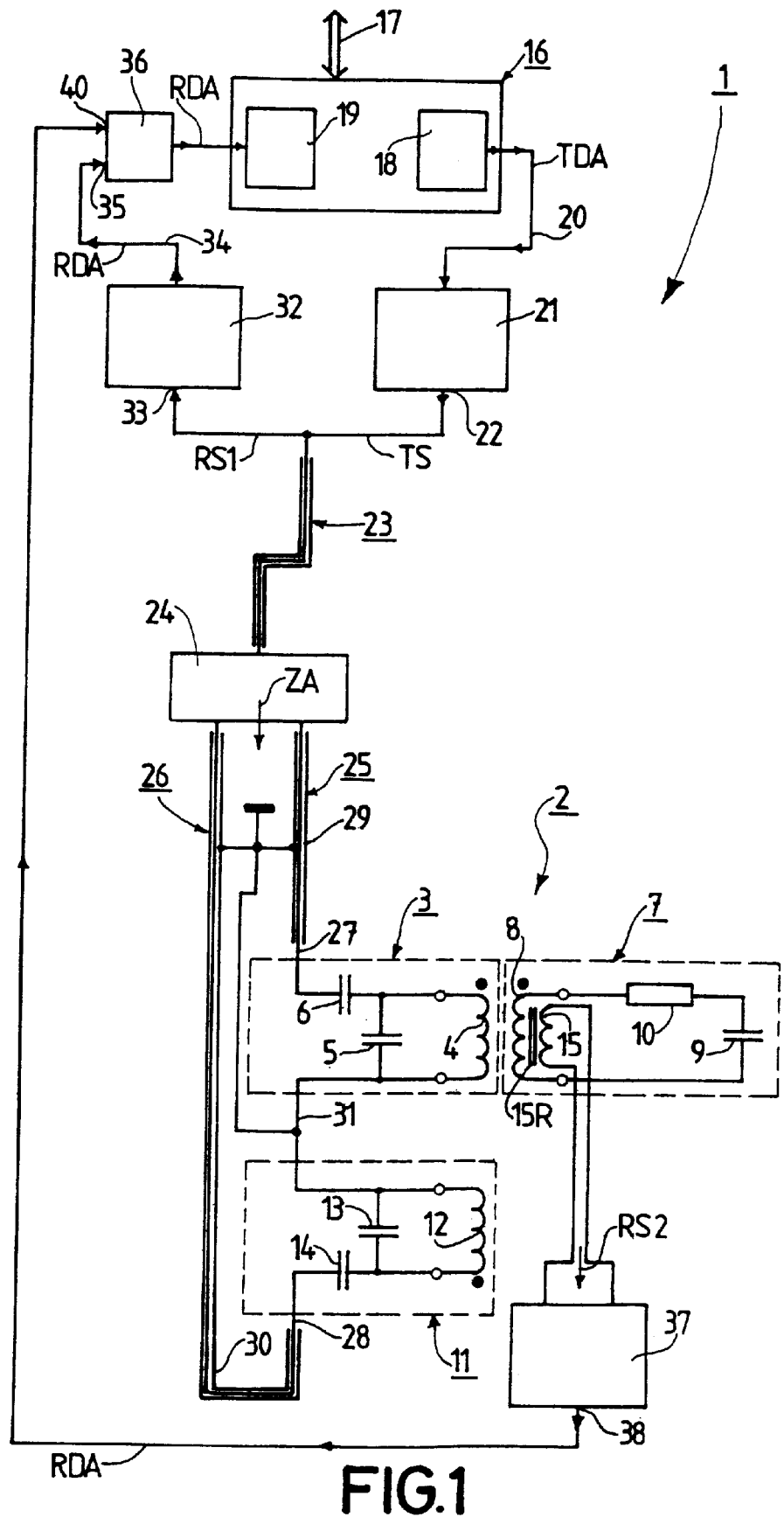
FIG. 1 shows diagrammatically, partly in the form of a block diagram, an embodiment of a communication station according to the invention which includes an embodiment of a transmission coil configuration according to the invention.

FIG. 1 shows a communication station 1 which is arranged for contactless communication with at least one transponder (not shown) and includes a transmission coil configuration 2 intended for use in the communication station 1.

The transmission coil configuration 2 includes an active, first transmission coil circuit 3. The first transmission coil circuit 3 includes a first transmission coil 4 and a first parallel capacitor 5 as well as a first series capacitor 6.

The transmission coil configuration 2 also includes a passive, second transmission coil circuit 7. The second transmission coil circuit 7 includes a second transmission coil 8 and a second parallel capacitor 9 as well as a resistor 10. As appears from FIG. 2, the second transmission coil 8 is oriented parallel to the first transmission coil 4, is arranged opposite the first transmission coil 4 and is inductively coupled to the first transmission coil 4. Because of the inductive coupling to the first transmission coil 4, a coil current which has been phase shifted essentially 90° relative to the coil current that can be driven through the first transmission coil 4 can be driven through the second transmission coil 8.

The transmission coil configuration 2 is advantageously also provided with an active, third transmission coil circuit 11. The third transmission coil circuit 11 includes a third transmission coil 12 and a third parallel capacitor 13 as well as a second series capacitor 14. As appears from FIG. 2, the third transmission coil 12 is oriented transversely of the first transmission coil 4 and also transversely of the second transmission coil 8 and is arranged so as to be offset relative to the first transmission coil 4 as well as relative to the second transmission coil 8. In the present case a coil current which has been phase shifted essentially 180° relative to the coil current that can be driven through the first transmission coil 4 can be driven through the transmission coil 12.

The transmission coil configuration 2 is also provided with a coupling coil 15 which is coupled to the second transmission coil 8 of the passive, second transmission coil circuit 7, said coupling being realized by means of a coupling ring 15A.

The communication station 1 also includes a microcomputer 16 which is capable of co-operating, for example with an external personal computer (PC) via a diagrammatically indicated BUS connection 17. Data generating means 18 and data evaluation means 19 are realized by way of the microcomputer 16. The data generating means 18 are capable of generating data TDA to be transmitted in the form of data blocks or data words. Data TDA generated by the data generating means so as to be transmitted can be applied, via an electrically conductive connection 20, to transmission means 21 in which a carrier signal with a carrier signal frequency of, for example approximately 13.56 MHz is amplitude modulated in dependence on the generated data TDA to be transmitted. An output 22 of the transmission means 21 is connected to a first coaxial cable 23 which has a nominal characteristic impedance of 50 ohms.

An impedance matching network 24 is connected to the first coaxial cable 23. A second coaxial cable 25 and a third coaxial cable 26 are connected to the impedance matching network 24, both coaxial cables having a respective nominal characteristic impedance of 50 ohms. The output resistance ZA that can be measured between the two coaxial cables 25 and 26 at the output side of the impedance matching network 24 in this case amounts to approximately 100 ohms. The inner conductor 27 of the second coaxial cable 25 is connected to the first series capacitor 6. The inner conductor 28 of the third coaxial cable 26 is connected to the second series capacitor 14. The two outer conductors 29 and 30 of the two coaxial cables 25 and 26 are connected to ground; an electrically conductive connection 31 between the first transmission coil 4 and the third transmission coil 12 is also connected to ground.

The transmission means 21 whereby a carrier signal can be amplitude modulated in dependence on data applied to the transmission means 21 is arranged to generate a transmission signal TS which can be applied to the transmission coil configuration 2 via the first coaxial cable 23 and the impedance matching network 24 as well as the two further coaxial cables 25 and 26. The transmission means 21 are electrically conductively connected to the first transmission coil circuit 3 and also to the third transmission coil circuit 11 via the first coaxial cable 23 and the impedance matching network 24 and the two coaxial cables 25 and 26.

The communication station 1 also includes first receiving means 32 whose input 33 is connected to the first coaxial cable 23. The receiving means 32 are electrically conductively connected, via the first coaxial cable 23 and the impedance matching network 24 and the two coaxial cables 25 and 26, to the first transmission coil circuit 3 and also to the third transmission coil circuit 11. The receiving means 32 are in this case arranged to receive a first receiving signal RS1 obtained by means of the first transmission coil circuit 3 and by means of the third transmission coil circuit 11. The first receiving signal RS1 is formed by an amplitude modulated carrier signal, said amplitude modulation being realized by load modulation of this carrier signal by means of a transponder communicating with the communication station. The receiving means 32 perform demodulation of the amplitude-modulated carrier signal, received data RDA being obtained after said demodulation. At the output side the receiving means 32 are connected, via an electrically conductive connection 34, to an input 35 of data collecting means 36 which themselves are connected to the data evaluation means 19 realized by means of the microcomputer 16.

The communication station 1 also includes second receiving means 37 which are connected to the coupling coil 15 and are arranged to receive and process a second receiving signal RS2 obtained by means of the coupling coil 15. The second receiving signal RS2 is processed by means of the second receiving means 37 and also subjected to demodulation, after which the second receiving means 37 output, via their output 38, the received data RDA which corresponds to the second receiving signal RS2. The output 38 of the second receiving means 37 is connected, via an electrically conductive connection 39, to a second input 40 of the data collecting means 36.

The data collecting means 36 can thus be supplied with received data RDA, corresponding to the first receiving signal RS1, and received data RDA, corresponding to the second receiving signal RS2, in order to collect the data RDA. The received data RDA is collected by the data collecting means 36, after which the data collecting means 36 can apply the collected data RDA to the data evaluation means 19.

Figure 2:
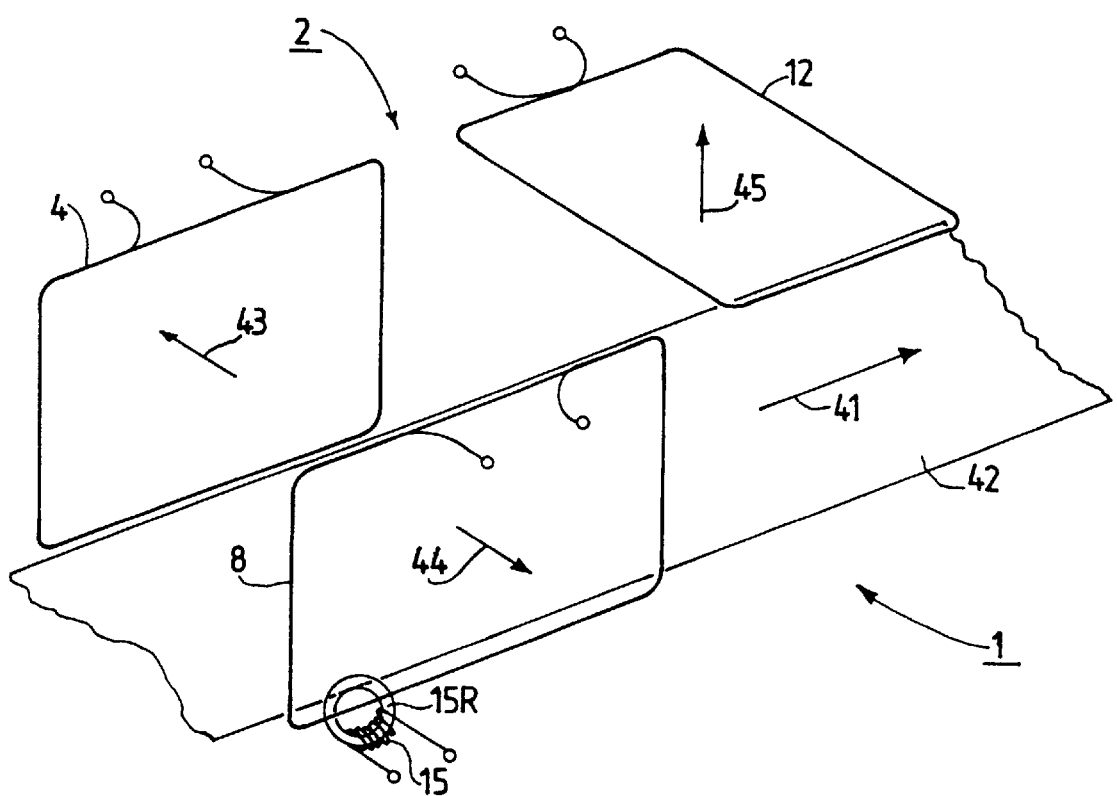
FIG. 2 shows the arrangement in space of three transmission coils of the transmission coil configuration of the communication station shown in FIG. 1 in relation to a conveyor belt for luggage.

The present embodiment of the communication station 1 is arranged to communicate with transponders which can be transported through a conveyor belt system in a transport direction 41. As is indicated in FIG. 2, the transponders (not shown) can in this case be transported in the transport direction 41 by means of a conveyor belt 42. For example, the transponders (not shown) are accommodated in luggage identification tags which are attached to pieces of luggage which are transported or moved in the transport direction 41 by means of the conveyor belt 42.

Referring to FIG. 2, concerning the transmission coil configuration 2 it is also to be noted that the first transmission coil 4 is arranged to the side of the conveyor belt system in a direction 43 which is perpendicular to the transport direction 41, i.e. to the side of the conveyor belt 42, and that the second transmission coil 8 is arranged to the side of the conveyor belt system, so to the side of the conveyor belt 42, in a second direction 44 which opposes the first direction 43. The third transmission coil 12 is then arranged in the horizontal position in a third direction 45, to the side of the conveyor belt system so to the side of the conveyor belt 42, in a third direction 45 which is perpendicular to the transport direction 41 as well as to the first direction 43 and the second direction 44. The third transmission coil 12 is then arranged so as to be offset in the transport direction 41 relative to the first transmission coil 4 and relative to the second transmission coil 8.

As is also shown in FIG. 2, the first transmission coil 4, the second transmission coil 8 and the third transmission coil 12 all have a flat construction. These three transmission coils 4, 8 and 12 are constructed in the form of a frame, i.e. they have an essentially rectangular shape with rounded corner areas. The transmission coils 4, 8 and 12, however, may also be constructed so as to have a circular, elliptical, oval, triangular shape or possibly also the shape of an eight.

FIG. 2 also shows that the third transmission coil 12 is mounted so as to be rotated 90° in space relative to the first transmission coil 4.

Concerning the three transmission coils 4, 8 and 12 it is also to be noted that the first transmission coil 4 and the second transmission coil 8 are wound in the same sense. The first transmission coil 4 and the third transmission coil 12 in the present embodiment are wound in the opposite sense. The winding sense of the three transmission coils 4, 8 and 12 is denoted a customary dot in FIG. 1. FIG. 1 also shows that the first transmission coil 4 and the third transmission coil 12 are connected in series and fed in the same sense so that, because of their opposed winding sense, it is achieved that the coil current that can be driven through the third transmission coil 12 has been phase shifted essentially 180° relative to the coil current that can be driven through the first transmission coil 4. In order to achieve such a phase shift of 180° between the coil currents through the first transmission coil 4 and the third transmission coil 12 it could also be arranged to connect the first transmission coil 4 and the third transmission coil 12 in series and to wind them with the same winding sense, but to feed them in the opposite sense.

By taking the described steps according to the invention and notably by utilizing the transmission coil configuration 2 according to the invention, a high degree of recognition reliability and communication dependability are achieved in the communication station 1, which reliability and dependability are significantly higher than those of communication stations and transmission coil configurations known thus far.

The coil current through the third transmission coil 12 in the described embodiment has a phase angle of 180° relative to the coil current through the first transmission coil 4. In an alternative embodiment this phase angle may also mount to 0°; the first transmission coil 4 and the third transmission coil 12 may then be wound in the same sense and be fed in the same sense or be wound in the opposite sense and be fed in the opposite sense.

What is claimed is:

1. A communication station (1) which is arranged for contactless communication with at least one transponder, and is provided with a transmission coil configuration (2) with an active, first transmission coil circuit (3) which includes a first transmission coil (4) wherethrough a coil current can be driven, and with a passive, second transmission coil circuit (7) which includes a second transmission coil (8) which is oriented essentially parallel to the first transmission coil (4), is arranged opposite the first transmission coil (4) and is inductively coupled to the first transmission coil (4) a coil current which has been phase shifted essentially 90° with respect to the coil current that can be driven through the first transmission coil (4) being drivable through said second transmission coil as a result of the inductive coupling to the first transmission coil (4), and is also provided with transmission means (21) which are arranged to generate a transmission signal (TS) and are connected to the first transmission coil circuit (3), and also with first receiving means (32) which are connected to the first transmission coil circuit (3) and are arranged to receive a first receiving signal (RS1) obtained by means of the first transmission coil circuit (3), and also with evaluation means (19) which are connected to the first receiving means (32) and whereby received data, corresponding to the first receiving signal (RS1) received by the first receiving means (32), can be evaluated, characterized in that the transmission coil configuration (2) is additionally provided with an active, third transmission coil circuit (11) which includes a third transmission coil (12) which is oriented transversely of the first transmission coil (4), is arranged so as to be offset relative to the first transmission coil (4), and through which there can be driven a coil current which has one of two phase angles relative to the coil current that can be driven through the first transmission coil (4), the two phase angles being 0° or 180°, and that the transmission means (21) and the first receiving means (32) are also connected to the third transmission coil circuit (11).

2. A communication station (1) as claimed in claim 1, characterized in that additionally there are provided coupling means (15) which co-operate with the second transmission coil (8) of the passive, second transmission coil circuit (7), and that there are provided second receiving means (37) which are connected to the coupling means (15) and are arranged to receive a second receiving signal (RS2) obtained by means of the coupling means (15), and that the second receiving means (37) are connected to the evaluation means (19) whereby, in addition to received data (RDA) corresponding to the first receiving signal (RS1), received data (RDA) corresponding to the second receiving signal (RS2) can be evaluated.

3. A communication station (1) as claimed in claim 2, characterized in that the coupling means (15) are formed by a coupling coil (15) which is coupled to the second transmission coil (8), which coupling is preferably realized by means of a coupling ring (15R).

4. A communication station (1) as claimed in claim 2, characterized in that at the output side data collecting means (36) are connected to the first receiving means (32) and the second receiving means (37), which data collecting means can be supplied with received data (RDA) corresponding to the first receiving signal (RS1) and with received data (RDA) corresponding to the second receiving signal (RS2) in order to collect this data (RDA) so as to apply the collected data (RDA) to the evaluation means (19).

5. A communication station (1) as claimed in claim 1, characterized in that the first transmission coil (4), the second transmission coil (8) and the third transmission coil (12) all are constructed so as to be flat.

6. A communication station (1) as claimed in claim 5, characterized in that the first transmission coil (4), the second transmission coil (8) and the third transmission coil (12) all are constructed so as to be shaped as a frame.

7. A communication station (1) as claimed in claim 5, characterized in that the third transmission coil (12) is arranged so as to be rotated 90° relative to the first transmission coil (4).

8. A communication station (1) as claimed in claim 1, characterized in that a coil current having a phase angle of 180° relative to the coil current that can be driven through the first transmission coil (4) can be driven through the third transmission coil (12).

9. A communication station (1) as claimed in claim 8, characterized in that the first transmission coil (4) and the third transmission coil (12) are connected in series, are wound in the opposite sense and are fed in the same sense.

10. A communication station (1) as claimed in claim 1, characterized in that the communication station (1) is arranged for contactless communication with transponders which can be transported in a transport direction (41) in a transport system (42), and that the first transmission coil (4) is arranged to the side of the transport system (42) in a first direction (43) which is essentially perpendicular to the transport direction (41), and that the second transmission coil (8) is arranged to the side of the transport system (42) in a second direction (44) which essentially opposes the first direction (43), and that the third transmission coil (12) is situated to the side of the transport system (42) in a third direction (45) which is essentially perpendicular to the transport direction (41) as well as to the first direction (43) and the second direction (44).

11. A communication station (1) as claimed in claim 10, characterized in that the third transmission coil (12) is arranged so as to be offset in the transport direction (41) relative to the first transmission coil (4) and relative to the second transmission coil (8).

12. A transmission coil configuration (2) which is intended for use in a communication station (1) for contactless communication with at least one transponder and is provided with an active, first transmission coil circuit (3) which includes a first transmission coil (4) wherethrough a coil current can be driven, and with a passive, second transmission coil circuit (7) which includes a second transmission coil (8) which is oriented essentially parallel to the first transmission coil (4), is arranged opposite the first transmission coil (4) and is inductively coupled to the first transmission coil (4), a coil current which has been phase shifted essentially 90° with respect to the coil current that can be driven through the first transmission coil (4) being drivable through said second transmission coil as a result of the inductive coupling to the first transmission coil (4), characterized in that the transmission coil configuration (2) is additionally provided with an active, third transmission coil circuit (11) which includes a third transmission coil (12) which is oriented transversely of the first transmission coil (4), is arranged so as to be offset relative to the first transmission coil (4), and through which there can be driven a coil current which has one of two phase angles relative to the coil current that can be driven through the first transmission coil (4), the two phase angles being 0° or 180°.

13. A transmission coil configuration (2) as claimed in claim 12, characterized in that
additionally there are provided coupling means (15) which co-operate with the second transmission coil (8) of the passive, second transmission coil circuit (7).

14. A transmission coil configuration (2) as claimed in claim 13, characterized in that
the coupling means (15) are formed by a coupling coil (15) which is coupled to the second transmission coil (8), which coupling is preferably realized by means of a coupling ring (15R).

15. A transmission coil configuration (2) as claimed in claim 13, characterized in that
at the output side data collecting means (36) are connected to the first receiving means (32) and the second receiving means (37), which data collecting means (36) can be supplied with received data (RDA) corresponding to the first receiving signal (RS1) and with received data (RDA) corresponding to the second receiving signal (RS2) in order to collect this data (RDA), so as to apply the collected data (RDA) to the evaluation means (19).

16. A transmission coil configuration (2) as claimed in claim 12, characterized in that
the first transmission coil (4), the second transmission coil (8) and the third transmission coil (12) all are constructed so as to be flat.

17. A transmission coil configuration (2) as claimed in claim 16, characterized in that
the first transmission coil (4), the second transmission coil (8) and the third transmission coil (12) all are constructed so as to be shaped as a frame.

18. A transmission coil configuration (2) as claimed in claim 16, characterized in that
the third transmission coil (12) is arranged so as to be rotated 90° relative to the first transmission coil (4).

19. A transmission coil configuration (2) as claimed in claim 12, characterized in that
a coil current having a phase angle of 180° relative to the coil current that can be driven through the first transmission coil (4) can be driven through the third transmission coil (12).

20. A transmission coil configuration (2) as claimed in claim 19, characterized in that
the first transmission coil (4) and the third transmission coil (12) are connected in series, are wound in the opposite sense and are fed in the same sense.

21. A transmission coil configuration (2) as claimed in claim 12, characterized in that
the transmission coil configuration (2) is arranged for contactless communication with transponders which can be transported in a transport direction (41) in a transport system (42), and
that the first transmission coil (4) is arranged to the side of the transport system (42) in a first direction (43)

which is essentially perpendicular to the transport direction (41), and that the second transmission coil (8) is arranged to the side of the transport system (42) in a second direction (44) which essentially opposes the first direction (43), and that the third transmission coil (12) is situated to the side of the transport system (42) in a third direction (45) which is essentially perpendicular to the transport direction (41) as well as to the first direction (43) and the second direction (44).

22. A transmission coil configuration (2) as claimed in claim 18, characterized in that the third transmission coil (12) is arranged so as to be offset in the transport direction (41) relative to the transmission coil (4) and relative to the second transmission coil (8).

* * * * *